US012748940B2

(12) United States Patent
Jennings

(10) Patent No.: US 12,748,940 B2
(45) Date of Patent: Sep. 29, 2026

(54) SYSTEM AND METHOD FOR A DISTRIBUTED LEDGER TRACKING ANIMALS

(71) Applicant: CattleProof LLC, Cheyenne, WY (US)

(72) Inventor: Robert W. Jennings, Cheyenne, WY (US)

(73) Assignee: CattleProof LLC, Cheyenne, WY (US)

( * ) Notice: Subject to any disclaimer, the term of this patent is extended or adjusted under 35 U.S.C. 154(b) by 0 days.

(21) Appl. No.: 17/889,159

(22) Filed: Aug. 16, 2022

(65) Prior Publication Data

US 2023/0058598 A1 Feb. 23, 2023

Related U.S. Application Data

(60) Provisional application No. 63/388,837, filed on Jul. 13, 2022, provisional application No. 63/249,436, (Continued)

(51) Int. Cl.
*A01K 11/00* (2006.01)
*G06K 19/06* (2006.01)
(Continued)

(52) U.S. Cl.
CPC . *G06K 19/07758* (2013.01); *G06K 19/06037* (2013.01); *H04L 9/0819* (2013.01); (Continued)

(58) Field of Classification Search
CPC ....... A01K 11/006; H04L 9/32; H04L 9/3236; H04L 9/3247; H04L 9/3263; H04L 9/50; H04L 9/0819
See application file for complete search history.

(56) References Cited

U.S. PATENT DOCUMENTS 8,037,846 B2 10/2011 Pratt
9,924,700 B1 3/2018 Kuper et al.
(Continued)

FOREIGN PATENT DOCUMENTS

WO 2016/118686 A1 7/2016
WO 2018/102592 A1 6/2018
(Continued)

OTHER PUBLICATIONS

Deloitte Ireland LLP. (2018). "Beefing Up Blockchain: How Blockchain can Transform the Irish Beef Supply Chain," 28 pages.
(Continued)

*Primary Examiner* — Benyam Haile
(74) *Attorney, Agent, or Firm* — Michele V. Frank; Venable LLP

(57) ABSTRACT

System, method, and non-transitory computer-readable storage media for allowing creating a record of an animal on a distributed ledger such as a blockchain. The animals have tags which, when read using a livestock tag reader, allow the owners of the animals to update the animal records with information about the animal, such as health and/or location data. The updated record can then be cryptographically signed and transmitted to a network server which verifies that the cryptographic signature corresponds to an owner's cryptographic signature for the animal.

20 Claims, 10 Drawing Sheets

Related U.S. Application Data filed on Sep. 28, 2021, provisional application No. 63/234,011, filed on Aug. 17, 2021.

(51) Int. Cl.

| | |
|---|---|
| ***G06K 19/077*** | (2006.01) |
| ***H04L 9/00*** | (2022.01) |
| ***H04L 9/08*** | (2006.01) |
| ***H04L 9/32*** | (2006.01) |

(52) U.S. Cl.

CPC .......... *H04L 9/3213* (2013.01); *H04L 9/3236* (2013.01); *H04L 9/3247* (2013.01); *H04L 9/50* (2022.05)

(56) References Cited

U.S. PATENT DOCUMENTS

| | | | | |
|---|---|---|---|---|
| 10,176,280 | B2 | 1/2019 | Mewes et al. | |
| 10,180,998 | B2 | 1/2019 | Mewes et al. | |
| 10,185,790 | B2 | 1/2019 | Mewes et al. | |
| 10,255,387 | B2 | 4/2019 | Mewes et al. | |
| 10,354,342 | B2 | 7/2019 | Kuper et al. | |
| 10,398,130 | B2 * | 9/2019 | Birch | A01K 11/006 |
| 10,628,756 | B1 | 4/2020 | Kuper et al. | |
| 10,673,847 | B2 | 6/2020 | Lidsky | |
| 10,682,062 | B2 | 6/2020 | Brandao | |
| 10,691,674 | B2 | 6/2020 | Leong et al. | |
| 11,055,633 | B2 | 7/2021 | Kuper et al. | |
| 11,109,576 | B2 | 9/2021 | de Santana et al. | |
| 11,307,728 | B1 * | 4/2022 | Rettedal | A01K 29/005 |
| 2011/0254225 | A1 | 10/2011 | Doherty et al. | |
| 2016/0120154 | A1 | 5/2016 | Hill et al. | |
| 2017/0274906 | A1 | 9/2017 | Hassan et al. | |
| 2018/0211718 | A1 | 7/2018 | Heath | |
| 2018/0338681 | A1 * | 11/2018 | Scherer | A01K 29/00 |
| 2019/0050926 | A1 | 2/2019 | Cooper | |
| 2019/0096534 | A1 | 3/2019 | Joao | |
| 2019/0304578 | A1 | 10/2019 | Kain et al. | |
| 2020/0034839 | A1 | 1/2020 | Soundararajan et al. | |
| 2020/0034945 | A1 | 1/2020 | Soundararajan et al. | |
| 2020/0159720 | A1 * | 5/2020 | Leong | G06F 16/2365 |
| 2020/0267936 | A1 * | 8/2020 | Tran | A01K 29/005 |
| 2020/0296091 | A1 | 9/2020 | Lidsky | |
| 2020/0296925 | A1 * | 9/2020 | Bennett | A01K 69/06 |
| 2020/0342207 | A1 | 10/2020 | Raczkowski et al. | |
| 2020/0351094 | A1 | 11/2020 | Canterbury et al. | |
| 2020/0383298 | A1 * | 12/2020 | Yang | A01K 11/004 |
| 2021/0118085 | A1 | 4/2021 | Bushnell et al. | |
| 2021/0182423 | A1 * | 6/2021 | Padmanabhan | H04L 9/3271 |
| 2021/0217001 | A1 * | 7/2021 | Harrison | G06F 21/6218 |
| 2021/0233091 | A1 | 7/2021 | Woo | |
| 2021/0250165 | A1 | 8/2021 | Crawford et al. | |
| 2021/0256070 | A1 | 8/2021 | Tran et al. | |
| 2021/0326764 | A1 | 10/2021 | Kuper et al. | |
| 2023/0214792 | A1 * | 7/2023 | Lee | G06Q 20/02 705/75 |
| 2023/0394993 | A1 | 12/2023 | Burton | |

FOREIGN PATENT DOCUMENTS

| | | | |
|---|---|---|---|
| WO | 2018/223102 | A1 | 12/2018 |
| WO | 2019/179035 | A1 | 9/2019 |
| WO | 2021/050775 | A1 | 3/2021 |

OTHER PUBLICATIONS

Ferdousi, T. (Sep. 2020). "A Permissioned Distributed Ledger for the US Beef Cattle Supply Chain," IEEE Access 8; pp. 154833-154847.

Robb, L. et al., (2020). "Panoptic blockchain ecosystems: An exploratory case study of the beef supply chain," Monash University Law Review 46.2; pp. 57-84.

Cofone, I. (2021). "Immunity Passports and Contact Tracing Surveillance," Stanford Technology Law Review, vol. 24, No. 2, retrieved at <https://law.stanford.edu/wp-content/uploads/2021/05/publish_this_cofone_immunity-passports-and-contact-tracing-surveillance_eic_final.pdf>; pp. 176-236.

Mashamba-Thompson, T. et al., (Apr. 2020). "Blockchain and Artificial Intelligence Technology for Novel Coronavirus Disease 2019 Self-Testing," Diagnostics vol. 10, No. 198, retrieved at <https://www.mdpi.com/2075-4418/10/4/198>; 4 pages.

Wilson, T. (Jan. 2021). "British hospitals use blockchain to track COVID-19 vaccines," retrieved at <https://www.reuters.com/technology/british-hospitals-use-blockchain-track-covid-19-vaccines-2021-01-19/>; 3 pages.

Nguyen, J. (Mar. 2021). "Blockchains are the building blocks of better healthcare," retrieved at <https://medcitynews.com/2021/03/blockchains-are-the-building-blocks-of-better-healthcare/>; 4 pages.

International Search Report and Written Opinion mailed Nov. 16, 2022, directed to International Patent Application No. PCT/US2022/040489; 8 pages.

Non-Final Rejection mailed Jan. 19, 2024, directed to U.S. Appl. No. 17/820,492; 14 pages.

Yang, L. et al., (2020). "Cloud-based Livestock Monitoring System Using RFID and Blockchain Technology", Institute of Electrical and Electronics Engineers, International Conference on Cyber Security and Cloud Computing, pp. 240-245.

Capterra, (2019). "Shelter Pro All Reviews", retrieved at <https://www.capterra.com>; pp. 1-13.

ShelterPro, (2005). "Shelter Pro Screen Samples Common", retrieved at <www.shelterpro.com>; pp. 1-7.

ShelterPro, (2005). "Shelter Pro Screen Samples Shelter," retrieved at <www.shelterpro.com>; pp. 1-7.

* cited by examiner

SYSTEM AND METHOD FOR A DISTRIBUTED LEDGER TRACKING ANIMALS

BACKGROUND

1. Technical Field

The present disclosure relates to a distributed ledger system for tracking animals, and more specifically to using NFTs (Non-Fungible Token) as a proof of ownership which allows owners to update the record of a particular animal.

2. Introduction

People are increasingly concerned about where and how their meat is raised, what vaccines and other veterinarian medicines were provided to the animals, if the animals were grass fed or corn fed, etc. However, tracking that information for each individual animal can be difficult. In addition, the possibility exists that entities within the supply chain may modify, falsify, or otherwise change the animal's record to enhance the perceived value of the resulting animal products. Similar problems exist with other domesticated animals, such as cats, dogs, and/or other pets, where the identity of the animal, how it has been cared for, and its ownership can be important to prospective buyers.

Supply chain systems using distributed ledgers (i.e., blockchain) have been developed to track products as they move from entity to entity, and eventually the retailer and consumer. However, such systems do not allow for additional information to be appended to an animal over its lifetime.

DETAILED DESCRIPTION

Figure 1A:
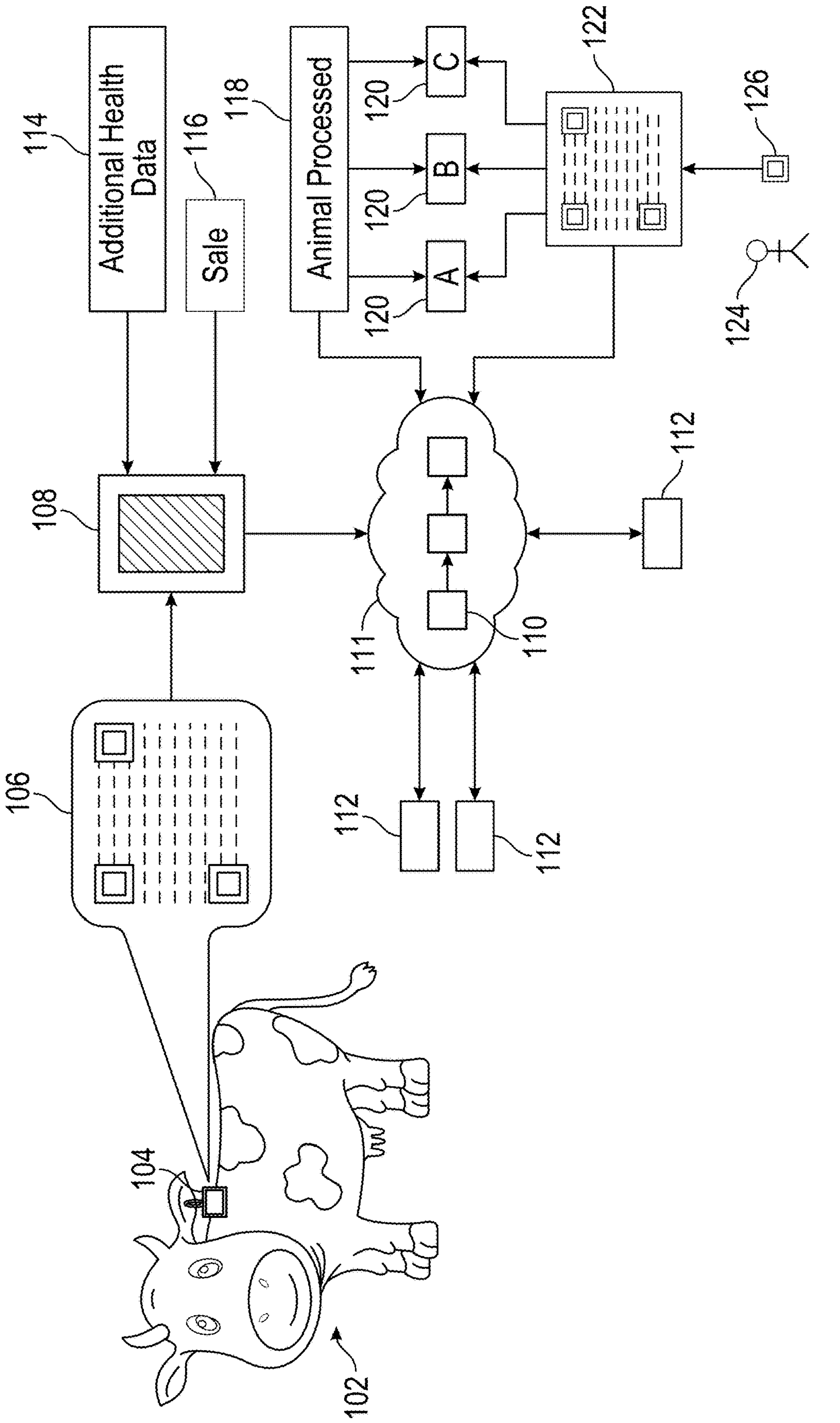
FIG. 1A illustrates a first example system configuration.

Various embodiments of the disclosure are described in detail below. While specific implementations are described, it should be understood that this is done for illustration purposes only. Other components and configurations may be used without parting from the spirit and scope of the disclosure.

A distributed ledger is a consensus of replicated, shared, and synchronized digital data geographically spread across multiple sites, countries, or institutions. Unlike with a centralized database, there is no central administrator. One particular type of distributed ledger is a blockchain. A blockchain is a shared, immutable ledger that facilitates the process of recording transactions and tracking assets in a business network. An asset can be tangible (a house, car, cash, land) or intangible (intellectual property, patents, copyrights, branding). Virtually anything of value can be tracked and traded on a blockchain network, reducing risk, and thereby cutting costs for all involved.

"DApps" (also known as decentralized apps) are typically decentralized, incentivized through providing tokens to those who validate the DApp, and in compliance with a specific protocol agreed upon within the community. DApps may run on top of distributed ledgers/computing systems such as Ethereum. For example, the decentralized applications are stored on and executed by a blockchain system and/or distributed ledger system.

Non-Fungible Tokens ("NFTs") (such as and including the ERC-721 Protocol, though other forms of NFT are equally applicable), can represent ownership over digital or physical assets. For example, NFTs can include:

- Physical property—houses, unique artwork
- Virtual collectables—unique pictures of kittens, collectable cards
- "Negative value" assets—loans, burdens, and other responsibilities In general, all houses are distinct, and no two kittens are alike. NFTs are distinguishable and the ownership of each one must be tracked separately.

The solutions disclosed herein make use of blockchain and NFTs to track living animals throughout their lives. These animals can include livestock, including (but not limited to) cattle, pigs, chicken, horses, oxen, mules, etc. The animals can also include pets, such as dogs and cats. This solution can also be used for verified tracking of wildlife such as deer, elk, bear, moose, birds, antelope.

An example system can follow the following steps:

The first step is to "tag" each animal with a unique identifier, meaning to implant, append, or affix a portable/mobile device on the animal which can identify a specific animal. Examples can include ear tags, or tags placed under the skin of the animal. In some cases, this tag can broadcast a signal using RFID (Radio Frequency Identification), Bluetooth, NFC (Near Field Communication), UHF (Ultra High Frequency), and/or any other type of wireless Radio Frequency communication, where the broadcast signal provides a unique identifier of the tagged animal (meaning no two animals would have the same identifier). In other cases, the tag can have a bar code (such as a QR code), or a written/printed number/identification (which can be recognized by image recognition systems) which, when scanned by a user, provides the unique identifier. As an example, a rancher, biologist, or other user can implant a sensor on the animal which provides regular "proof of life" data updates via Bluetooth such as heart rate, temperature, movement, location, and other health data. In some cases, these updates can be wirelessly transmitted from the implanted device to a server, which can collect the data in a lifetime record for the animal. In other cases, the updates can be wirelessly transmitted from the implanted device to a mobile device, such as a smartphone, tablet, or other portable computing device, which can then relay the information to the server. In yet other cases, the health/location/other data for the animal can be manually entered into a record on the mobile device by the user who has scanned and identified the animal, at which point it can be relayed to the server. For example, manual data input from the user can be entered via an app on a smartphone, providing the ability to add information about the animal such as sex, non-hormone treated, source/age verification, antibiotic-free, grass or grain fed, all-natural, organic, and/or vaccinations.

The system can also utilize biometric recognition (such as facial photos and videos), processed through artificial intelligence for each animal. For example, when tagging the animal, a photograph or video of the animal can be taken and processed. Later, when additional photos or video of the animal is captured, the animal can be identified. The additional photos, video, and or location of the animal can then be added to the overall record of the animal.

In some configurations, such as a ranch where the owner of the animals wants to be in (relatively) constant communication with the tags, the rancher's smartphone, field processor, or another remote sensor can be configured to receive signals from each tag (for example, establishing a Bluetooth connection between each tag and the rancher's smartphone, or establishing an RFID connection between the tags and an RFID receiver/sensor which in turn relays the data to a server) to capture a unique identifier associated with each implant.

The unique digital identity data for each animal (biometric images+unique Bluetooth identification+rancher input) can be sent via a DApp (Decentralized App) to the Ethereum blockchain as part of a smart contract, resulting in an ERC-721 non-fungible token (NFT) for each individual animal. By settling the data on a distributed ledger system, an immutable record of the animal (including date/time/GPS/health records) is created.

The smart contract which creates the NFTs can also place the NFTs within wallets of an owner, manager, producer, or other individual with responsibility for the animal associated with the NFT. For example, the system can place the NFT for a tagged cow into the electronic wallet of the rancher who owns the tagged cow. Once each token is sent to the secure digital wallet of the owner of the animal (or supervisor in the case of wildlife), metadata such as feed, health treatments, veterinary and brand inspections, genetic information, photos and video of the animal, GPS locations and other relevant information can be added to each token. That is, the NFT is not fixed in size or content, and additional information can be appended to the NFT over time. For example, as the animal moves locations, the updated locations can be added to the NFT record. Likewise, as the animal undergoes various treatments, those treatments can be added to the animal's NFT record.

In some configurations, the system can allow for fractional ownership of each animal, creating the ability to sell a portion of the animal (e.g., a quarter beef or any other fraction) direct to buyers or investors. In other words, multiple parties may own a single animal, with each owning entity having the ability to sell or exchange their portion. In such configurations, the ownership of the animal can be separated from the ability to append data to the NFT. For example, while all owners may have the ability to sell/exchange their tokens, a single owner or responsible entity may be tasked with the ability to append data about the associated animal. Any metadata that entity adds would then be propagated to the other tokens associated with the animal. In other configurations, all of the users having tokens associated with an animal can append data to the NFTs.

When the owner or manager of the animal sells or transfers ownership of the animal, the system allows transfer of the animal's NFT from the digital wallet of the first owner to the digital wallet of the second owner. As the user interacts with the system via a smartphone app, they can transfer the NFT (including any appended metadata) from the digital wallet of the owner/custodian to the digital wallet of the new owner/custodian. If, for example, this is being done on the Ethereum blockchain, transfer of the NFT from one owner to another can require a certain amount of "gas," to perform the transaction. This process of appending metadata about the animal and/or transferring ownership of the animal can continue throughout the animal's lifetime.

As the ultimate repository for all data sources associated with the history of an animal, the system provides traceability for all interested parties. The system's blockchain technology, built on Ethereum smart contracts (though any smart contract blockchain/immutable ledger can also work), allows verification of the unique data sources and can create proof of ownership. Each individual animal can be represented as an ERC-721 token, or Non-Fungible Token (NFT) and securely stored in the owner's private digital wallet while collecting and adding metadata (health, feed, movement, heartbeat, facial analysis, etc.) to the NFT. The token owners can share data with permissioned viewers such as inspectors, buyers, vets, or animal processors. Every animal's data record will remain with it through harvest, and a unique QR code can be printed on the packaging of resulting animal products. Consumers will be able to scan the QR code with any smart device to get select details on that specific animal including proof of identity.

By providing industry producers with this solution, the project participants provide private, secure, immutable proof of ownership and traceability for animals seamlessly across the supply chain from ranch-to-consumer, or throughout the lifetime of a pet, wildlife animal, etc.

Consider the following series of example steps for an exemplary rancher interacting with cattle.

1) Rancher registers at on a system website (name, ranch, location, etc . . . ).

2) The rancher sets up a digital wallet.

3) The rancher has herd ready for tagging.

4) Individual cows are pulled aside and tagged with a visual, RFID, UHF or Bluetooth tag.

5) The rancher opens an app on their phone and uses a smartphone or tag scanner to read the tag unique identifier of each animal, as well as collect GPS (Global Positioning System)/date/time data.

6) The rancher can take a photograph and/or video of a cow.

7) The rancher can use an app which allows the rancher to enter custom information (breed, sex, vaccines, color, grass-fed, etc . . . ) about the individual cow.

8) Information about the animal is sent from the rancher's phone (ultimately) to a distributed ledger.

9) Information is verified by a decentralized network and "hashed' onto the distributed ledger, thus creating digital token of each animal that will reside in rancher's digital wallet as proof of ownership.

10) The rancher can add metadata/information to each individual animal manually or through upload (brand inspection certificate, certificate of veterinary inspection, PVP certification, health treatments).

11) The rancher can give permission to third parties to view token information (regulators, vets, buyers, feedlots).

12) A buyer of the animal registers with the system and sets up digital wallet.

13) The rancher makes a deal with the buyer to buy cattle based on attributes of each animal which are verified by the blockchain record.

14) The rancher delivers the cattle to buyer and buyer inspects cattle. Both agree terms of sale have been met. Each party verifies agreement through the system/an app associated with the system.

15) The token created by the smart contract is transferred to the digital wallet of the buyer of cattle.

16) Payment from the buyer is transferred in real time to rancher. The buyer can pay in US dollars or cryptocurrency via the system/app.

17) The cattle go to a feed lot or pasture and more data is added by the new owner.

18) The cattle go to an animal processor and more data added.

19) The cattle are cut into fractions and go to consumer.

20) Consumer scans QR code associated with each respective animal and gets the history of the animal.

Some exemplary benefits of this system include:

Using a smart contract protocol to capture, verify and display valuable data on animals, while reducing inefficiencies in the process.

Creating a 100% verifiable digital record of source, age, and country of origin on each animal.

Creating a chronological timeline of the animal using all the data collected throughout the lifecycle of the animal, which can include a daily "snapshot" of the animal (such as health data, pictures/video, and geolocation of the animal).

Creating a direct link of verified information between the producer and the consumer.

Creating a stream of verified and trusted data in a trustless ecosystem from multiple IoT collection devices in combination with manually created inputs.

The tokens allow for the animals to be collateralized, so the owner can get credit instantly at point of sale and satisfying liens. These tokens can also act as collateral for lenders, where the tokens can be held by a lender or in escrow as part of a loan or contract.

Provides Complete data security for the animal owner because of encryption and immutable nature of the system.

Provides for secure individual tracking of animals and all associated metadata.

Creates rules for fractional ownership of each animal, creating the ability to sell any fraction of the animal directly to buyers or investors.

Provides a platform for third-party certifiers to digitally verify and audit process claims (e.g., grass-fed, organic, all-natural, NHTC, etc.)

The token owners can share data with permissioned viewers such as inspectors, buyers, veterinarians, or processors.

Every animal's data record will remain with it through harvest, and a unique QR code will be printed on the packaging.

Consumer's will be able to scan the QR code with any smart device to get select details on that specific animal including proof of identity (source and age verified).

Regarding how verification of uploaded records is implemented, preconditions to verifying a cryptographic signature from a purported owner can include: (1) The uploaded record comes from another system; (2) The uploaded record includes specification of an individual livestock, such as by referencing an ERC-721 token identifier; (3) The uploaded record includes a cryptographic signature, such as an elliptic curve cryptography; (4) Ownership records for individual livestock are identified, such as by referencing an ERC-721 token identifier; and/or (5) Ownership records for individual livestock are associated with an owner's cryptographic signature, such as an elliptic curve cryptography asymmetric public key.

Verification that the cryptographic signature of the uploaded recorded corresponds to the owner's cryptographic signature for the animal can occur by: (1) Recovering the cryptographic asymmetric public key from the uploaded record cryptographic signature, such as by using the elliptic curve digital signature algorithm (ECDSA) public key recovery function; (2) Comparing the recovered public key from the uploaded record to the corresponding livestock owner's public key; and (3) If these are matching, the verification is successful; otherwise the verification is a failure.

After verification is successful, the system can transmit the uploaded record to the distributed ledger. This can include: (1) Storing the uploaded records; (2) Noting those records are authorized; and/or (3) Storing these authorized records in such a way that authorized records for a given token may be retrieved, such as by storing them as metadata on the livestock ERC-721 token.

The verification step can allow the curation of documents which are authorized by the owner of the livestock. One potential use case is that the owner of livestock may encumber their ownership record with a financial lien. Such a lien can be verified as being authorized and submitted by the actual owner of the livestock. Banks and other financial intermediaries can depend on this lien being binding on the actual livestock owner since the livestock owner authorized it. Another hypothetical system which does not include the verification step would be much less useful in this use case because any liens recorded in that system may have been a result of an upload by the system administrator or some other party and which is not authorized by the livestock owner.

Appending additional information to an existing token, such as a token associated with a specific animal, requires that an updated record has been provided for a given token and that the record is authenticated as having been sent by the owner of the livestock. The appending process can then include: (1) The existing reference of file(s) attached to the token (if any) are retrieved from the blockchain, such as by using a SHA-256 hash of the file(s) as attached to the token's ERC-721 metadata; (2) The new file(s) are inspected to ensure that reference is made to the existing reference of file(s) (if any), such as by inspecting a designated location in a JSON payload; (3) If the new file(s) does not include a reference to the existing file(s) (if any) the update is rejected, such as by revert the blockchain transaction; (4) The new file(s) are set as the token's reference, such as by setting the ERC-721 metadata to the file(s) SHA-256 hash; and (5) The new file(s) are persisted to disk, such as by saving the files in the content-addressable file storage system IPFS.

Because the blockchain is based on multiple, disinterested, distributed parties that have strong economic incentives to ensure all blockchain rules are followed, inspecting the current state of the blockchain provides prima facie evidence that all records were produced within the specifications of the constituent smart contracts. In the instance of the present invention, the smart contract ensures that all records attached to a token (i.e., associated with a livestock) were added under the authority of that token's then-owner. And furthermore, because every version of the every uploaded document is referenced in the current version of the token or is referenced (recursively) in subsequent document versions that are referenced in the current version of the token, this ensures that every token provides a full and auditable history of all documents attached to the token. The result is that all for all livestock are preserved in a tamper-proof and permissioned system that allows only the owner of livestock to augment records.

In some configurations, prior to appending the animal records to a blockchain as an NFT, the system can add the animal record (including ownership) to a decentralized database. Uploading the animal record to a decentralized database rather than a centralized server prepares the animal record for being used on the blockchain, while avoiding costs/computational requirements of adding the record to the blockchain (or converting the record to an NFT). For example, the animal records can be stored on a Web3, IPFS (InterPlanetary File System), or other peer-to-peer (i.e., decentralized) storage system. Once the animal records are stored on the decentralized storage system, the records can be added to the blockchain by the system (rather than requiring the animal owner to perform the act of uploading the information to the blockchain). Likewise, in some configurations, the uploaded animal records can be forwarded to a website or a centralized database, where the records can be processed prior to being added to the blockchain.

FIG. 1A illustrates a first example system configuration. In this example, an animal 102 is tagged 104 by its owner, allowing the owner to create a digital record of the animal 102 which is stored in a distributed ledger 110. In this example, the animal 102 is a cow, but in other cases can be other types of cattle, deer, pigs/swine, or other animals. In this case, the tag 104 has a QR (Quick Response) code 106 which can be scanned by a mobile computing device 108, such as a smartphone, tablet, or other device with a camera. In other configurations, the tag 104 can have an RFID (Radio Frequency Identification), which can communicate identification information about the animal 102 to the mobile computing device 108 via radio signals.

The first time the tag 104 is read by the mobile computing device 108, the animal's 102 owner can create a digital record of the animal 102 and store that digital record on a distributed ledger 110. Preferably, the distributed ledger 110 is accessed through a network 111, such as the Internet. The distributed ledger 110 can be, for example, Ethereum or another type of blockchain, where the distributed ledger 110 is stored in multiple locations and requires consensus by other computing devices 112 before making additions to the blockchain. The other computing devices 112 can be, for example, other users of the distributed ledger 110, other system users, or others showing proof of stake/ownership of some part of the distributed ledger 110.

The owner of the animal 102 can be the sole entity which can make updates to the animal's digital record stored on the distributed ledger 110. If, for example, the owner wishes to add additional information about the animal 102 to the digital record regarding the animal's health 114 (shots, diseases, etc.), location (e.g., GPS (Global Positioning System) coordinates, selected pastures), genealogy, diet, or other aspects of the animal's life, the owner can make those additions to the digital record. Likewise, if the owner were to sell 116 the animal 102 to another entity, aspects of the sale can be recorded in the animal's digital record, and the right to update the animal's digital record can be transferred to the new entity.

Once the animal 102 is processed 118, the animal can be packaged 120 for distribution (i.e., sold in a grocery store or otherwise provided to individuals). On those packages 120 can be a QR code 122 which, when scanned by a consumer's 124 mobile device 126 (such as a smartphone or tablet), allows the consumer to view the history of the animal 102 from the animal's digital record as stored on the distributed ledger 110. For example, a shopper in the grocery store can scan a QR code on a package of beef and be provided the history of the animal from which that beef was harvested, with the added benefit that because the animal record is part of a distributed ledger 110, the shopper can be assured that the record has not been manipulated by any entity.

Figure 1B:
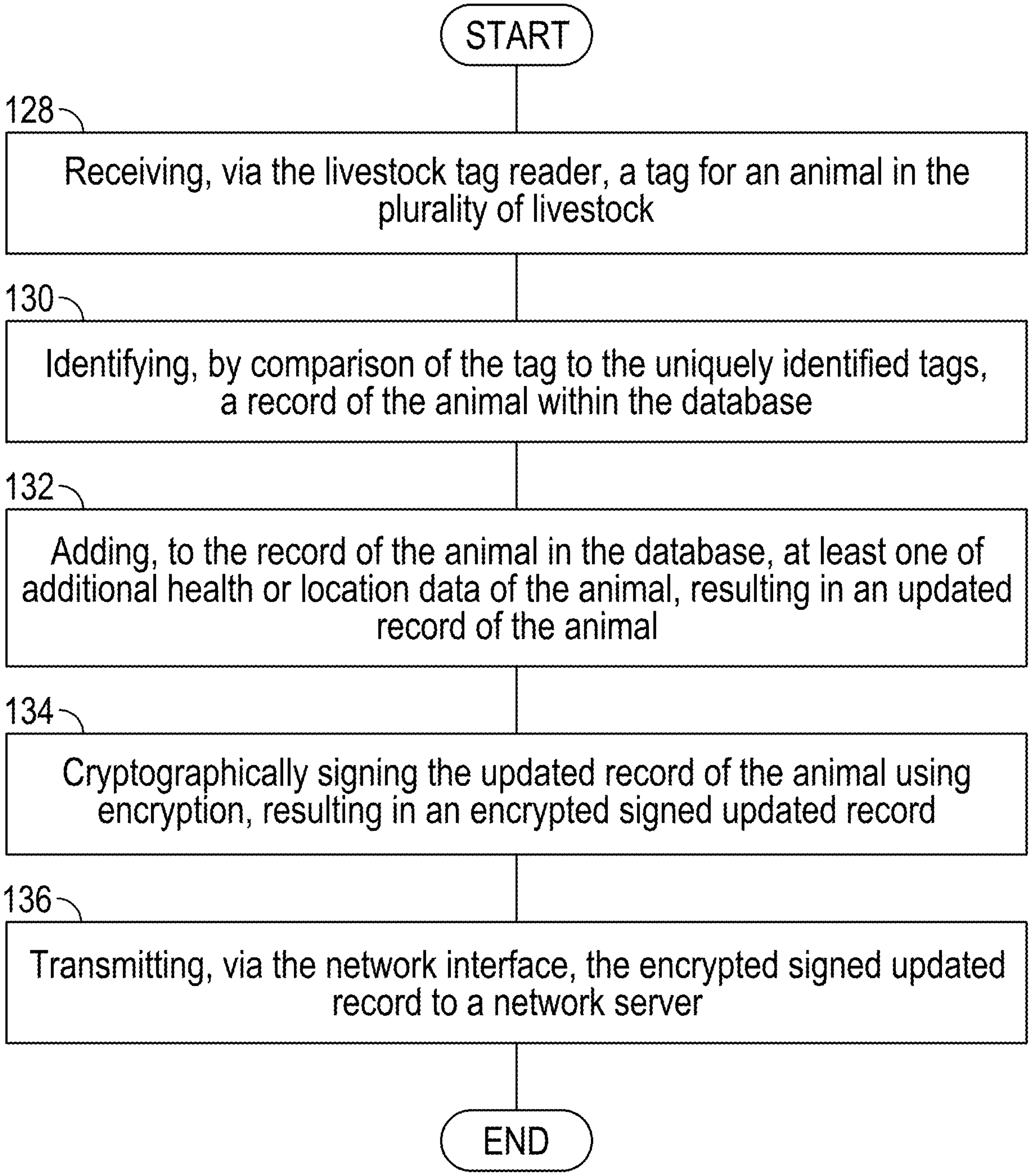
FIG. 1B illustrates a first method embodiment.

FIG. 1B illustrates a first example method embodiment. As illustrated, the system performing the illustrated method, such as a handheld mobile device (smartphone, tablet, or other mobile computing device) can receive, via the livestock tag reader (such as a Bluetooth receiver, camera, etc.), a tag for an animal in the plurality of livestock (128). The system can then identify, by comparison of the tag to the uniquely identified tags, a record of the animal within the database (130). As the owner of an animal cares for the animal, tracks it, etc., the owner can use the system to add, to the record of the animal in the database, at least one of additional health or location data of the animal, resulting in an updated record of the animal (132). The system can then cryptographically sign the updated record of the animal using encryption, resulting in an encrypted signed updated record (134), and transmit, via a network interface, the encrypted signed updated record to a network server (136).

Figure 2:
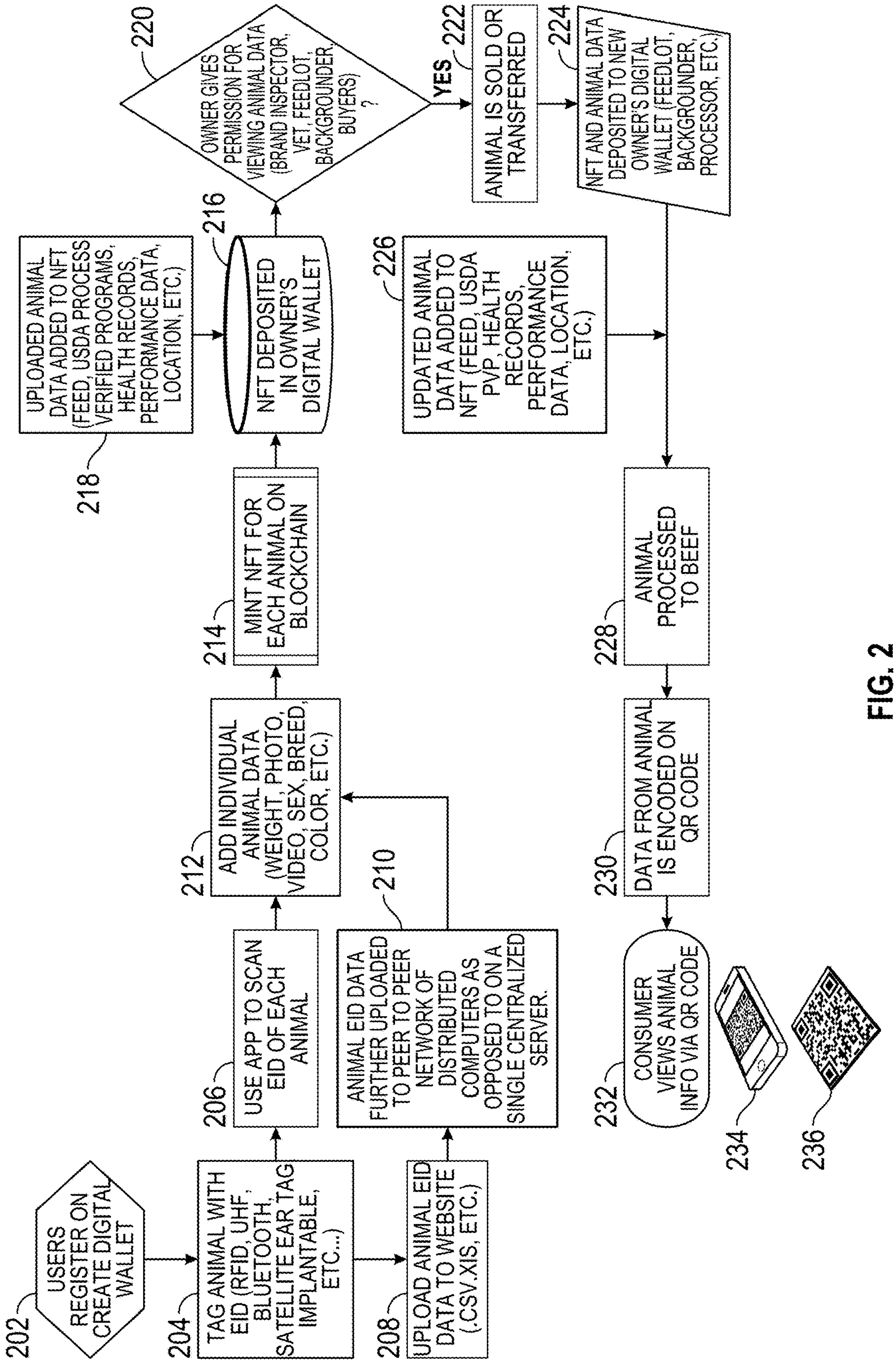
FIG. 2 illustrates an example system process diagram.

FIG. 2 illustrates an example system process diagram. In this example, users (such as the owner of a ranch or of an animal) with the system to create a digital wallet 202, in which they can maintain records of their animals. The animal is then tagged with an EID (Electronic Identification), such as an RFID (Radio Frequency ID), UHF (Ultra High Frequency), Bluetooth, or satellite ear tag 204. Alternatively, in some cases the animal can be tagged with an implantable tag. The owner then uses an app on their smartphone or other mobile computing device to scan the EID of each animal 206, and can upload the animal EID data to a website. Exemplary formats for the data upload can include a .csv, .xls, or other data format 208. The animal EID data can also be uploaded to a distributed ledger, such as a peer-to-peer network of distributed computers as opposed to a single centralized server 210. The owner can add information about the individual animals associated with their digital wallet, such as weight of the animal, photos, video, sex, breed, color, etc. 212.

As illustrated, individual animal records can be minted into a NFT (Non-Fungible Token) associated with a blockchain/distributed ledger 214. The NFT can be deposited into the owner's digital walled 216, and the owner can update the NFT with aspects of the life of the animal such as feed, USDA (U.S. Department of Agriculture) process verified programs, health records, performance data, location where the animal was on a given day, veterinarian treatments, etc. 218. The owner can provide permission for viewing animal data to certain individuals, such as a brand inspector, a veterinarian, a feedlot entity, those interested in the background of the animal, and/or prospective buyers of the animal 220. Once the animal is sold or transferred 222, the NFT and animal data can be transferred/deposited into the new owner's digital wallet 224, allowing the new owner to continue providing updated animal data 226 to the animal's digital record.

Once the animal is processed (e.g., a cow is processed to beef) 228, the data associated with the animal's digital record can be encoded and associated with a QR code 230. Consumers in the supermarket or other location can then use their smartphone 234 or other mobile computing device to scan a QR code 236 and view the animal information 232.

Figure 3:
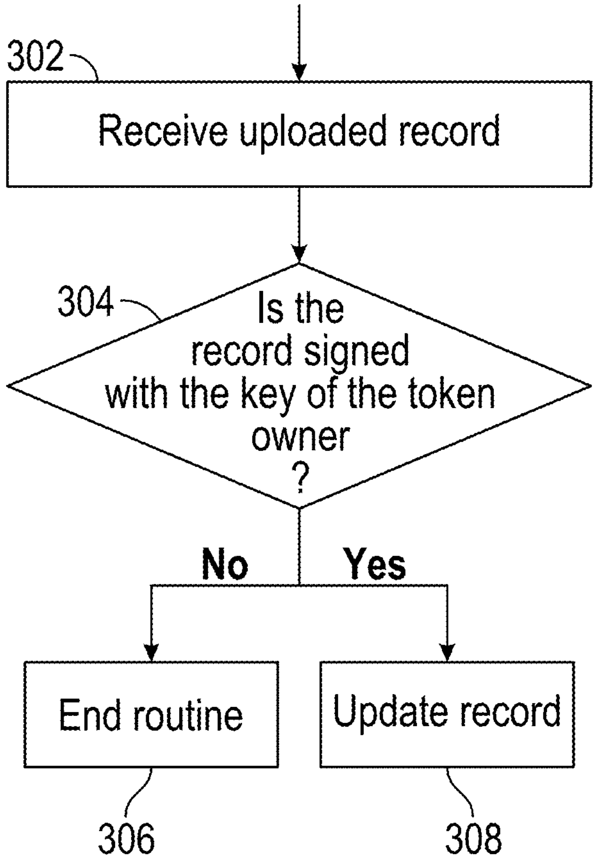
FIG. 3 illustrates an example verification process.

FIG. 3 illustrates an example verification process. This example illustrates the sole capability of the owner of an animal to append information to the animal's digital record. As additional information about the animal is generated, the system can receive that information as an uploaded record 302. The system can determine if the record is signed with the key (e.g., a private key) of the token (e.g., the NFT associated with the animal record) owner 304. If not, the verification fails, and the process ends 306. If the record is signed with the owner's key, then the system can update the record 308.

Figure 4:
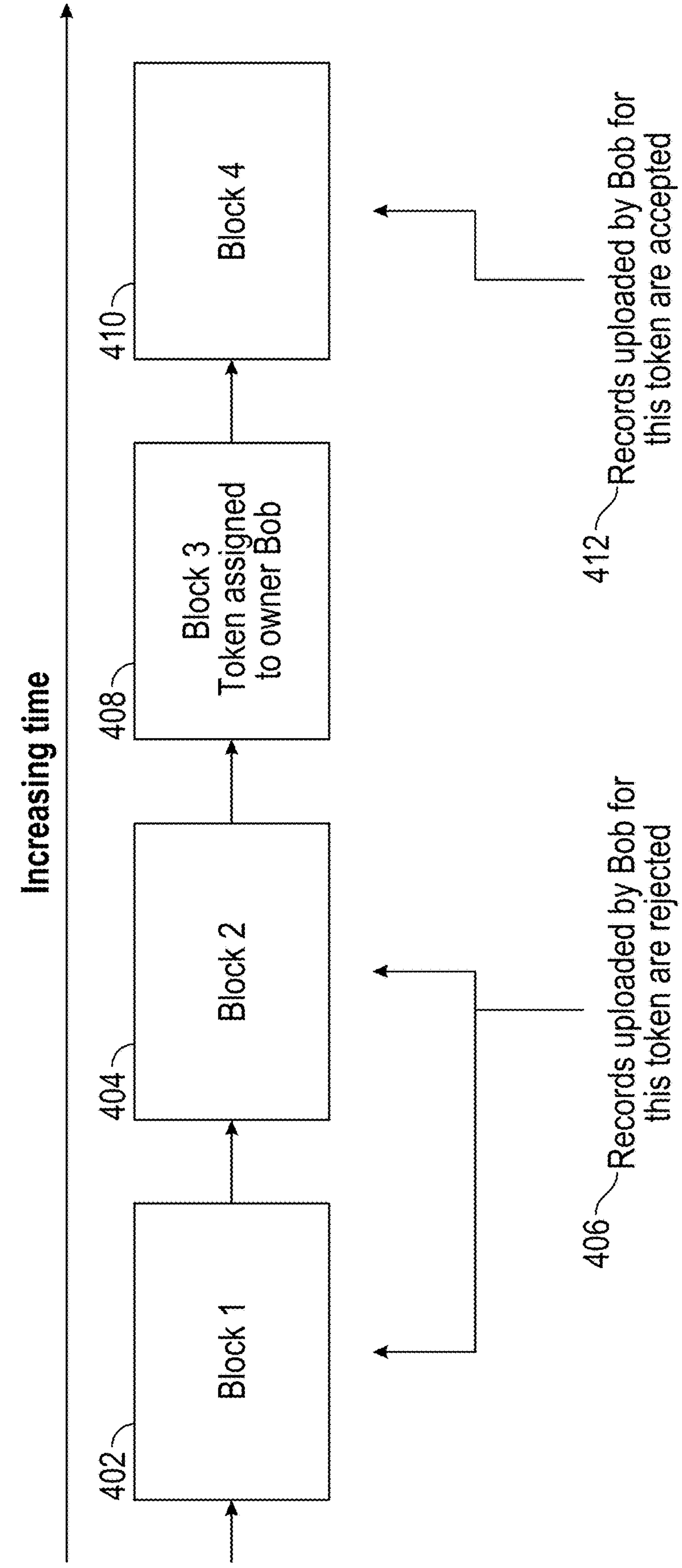
FIG. 4 illustrates an example temporal diagram of adding appended records to a blockchain.

FIG. 4 illustrates an example temporal diagram of adding appended records to a blockchain. In this case, new blocks 402, 404, 408, 410 are being added over time, forming the blockchain. As illustrated, an animal owner "Bob" tries to upload records associated with an animal before Bob is assigned as the owner of the animal, resulting in the record upload being rejected 406. At block 3 408 the token recording the owner of the animal is assigned to Bob, which allows Bob to upload records associated with the animal later (e.g., in Block 4 410). When Bob uploads the records at that later time, the upload is accepted 412.

Figure 5:
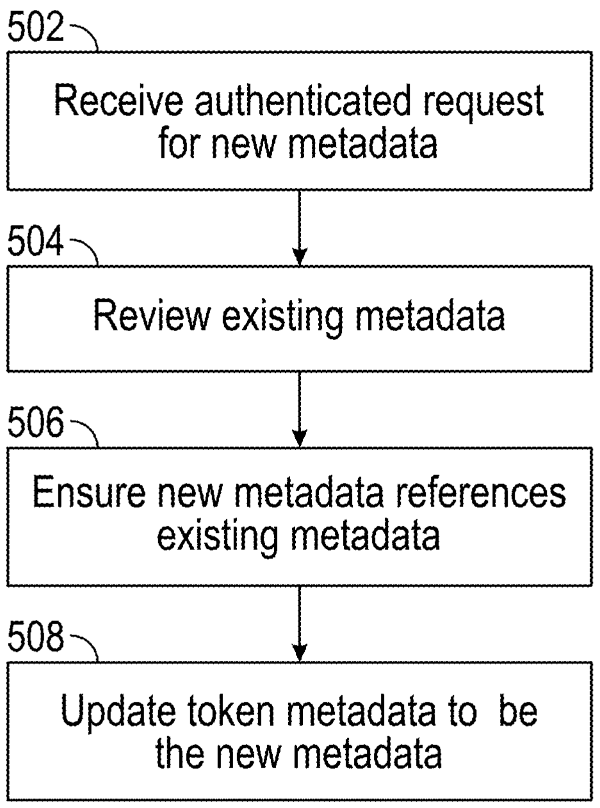
FIG. 5 illustrates an example of adding additional data to a token.

FIG. 5 illustrates an example of adding additional data to a token. In this example, the system receives an authenticated request for new metadata 502. For example, the owner of an animal may be updating the health records associated with the animal. To add the additional data, the system first reviews the existing metadata 504 to ensure that the data being added to the animal record references existing metadata 506. For example, does the metadata being added fit into a category or datatype already existing within the animal record? If so, the new data can be added, whereas if the data does not match an existing category or datatype the data may be rejected. The system then updates the token metadata, allowing the new/updated data to become the new metadata 508 within the animal record.

Figure 6:
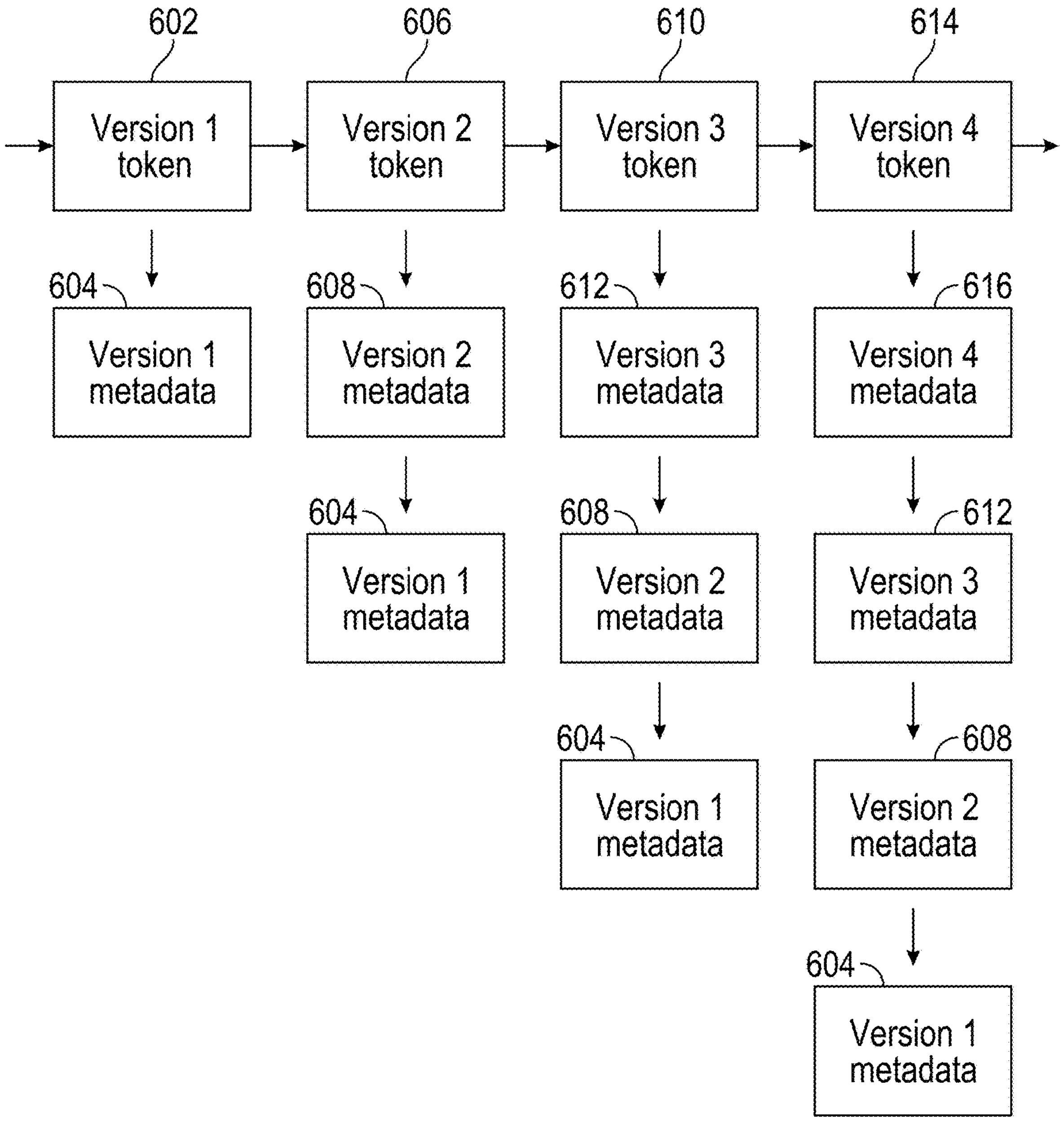
FIG. 6 illustrates an example data model diagram.

FIG. 6 illustrates an example data model diagram. In this example, metadata associated with a token can be updated, and because the token is stored on a blockchain, each subsequent piece of metadata refers to the previously stored metadata, and each subsequent version of a token refers to the previous version of the token. With that background, the first version of the token 602 has a single piece of metadata ("Version 1 metadata") 604. The next version of the token 606 refers to the first version of the token 602, and the metadata 608 of the second version of the token 606 refers to the first version of the metadata 604. Likewise, the third version of the token 610 refers to the second version of the token 606, and the fourth version of the token 614 refers to the third version of the token 610. The metadata 612 of the third version of the token 610 refers to the second version of the metadata 608, which refers to the first version metadata 604. Similarly, the metadata 616 of the fourth version of the token 614 refers to the third version of the metadata 612, which refers to the second version of the metadata 608, which refers to the first version of the metadata 604. In this manner, the blocks 602, 606, 610, 614 associated with the tokens within the blockchain are updated, and the metadata 604, 608, 612, 616 associated with the tokens are updated, while everything refers to previous versions/iterations.

Figure 7:
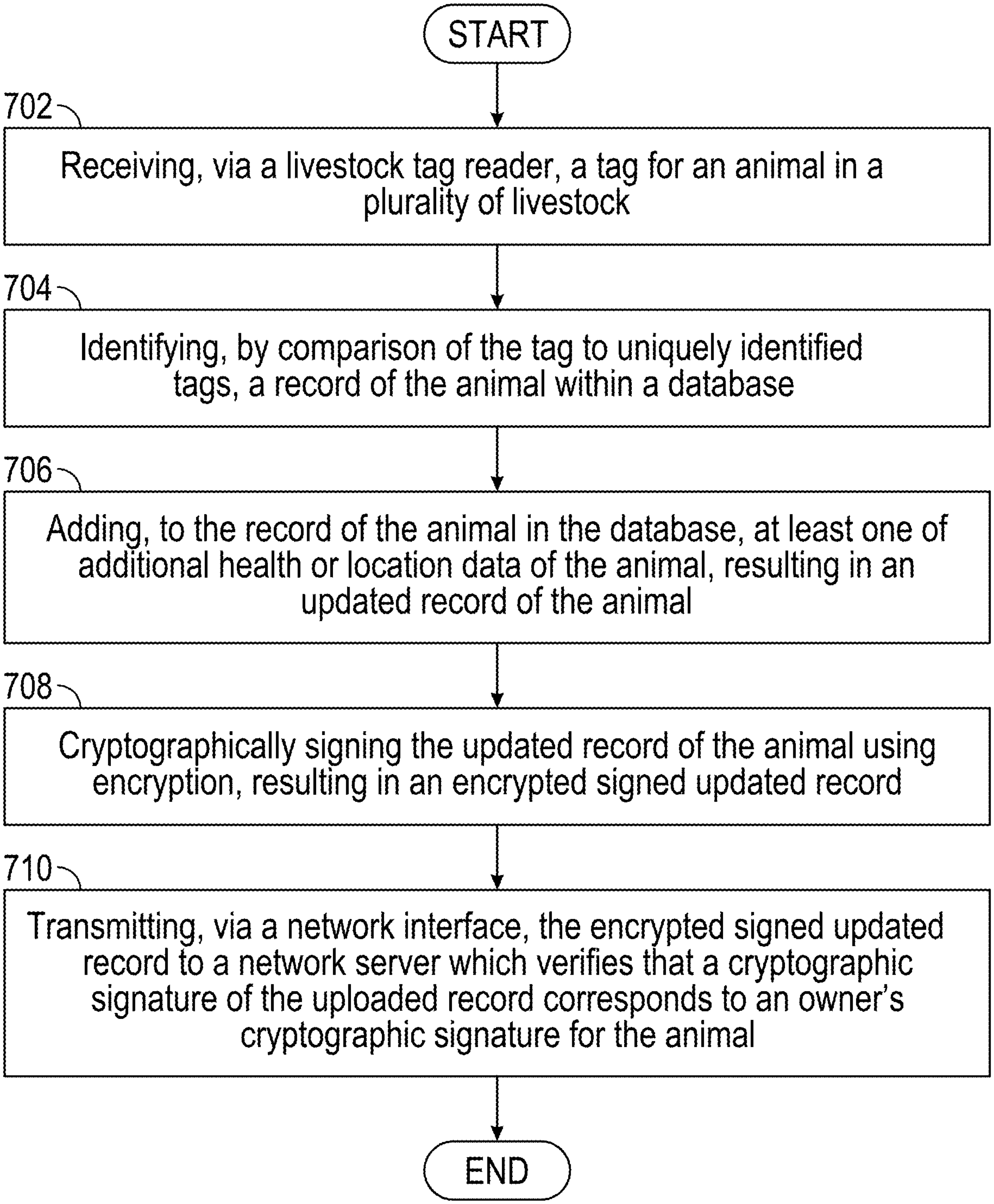
FIG. 7 illustrates a second example method embodiment.

FIG. 7 illustrates a second example method embodiment which can, for example, be performed by a system which includes at least one processor, a network interface, a livestock tag reader, and a database storing uniquely identified tags for a plurality of livestock, and storing records associated with the plurality of livestock.

In this example, the system receives, via a livestock tag reader, a tag for an animal in a plurality of livestock (702). The system then identifies, by comparison of the tag to uniquely identified tags, a record of the animal within a database (704), and adds, to the record of the animal in the database, at least one of additional health or location data of the animal, resulting in an updated record of the animal (706). The system then cryptographically signs the updated record of the animal using encryption, resulting in an encrypted signed updated record (708). The system can then transmit, via a network interface, the encrypted signed updated record to a network server which verifies that a cryptographic signature of the uploaded record corresponds to an owner's cryptographic signature for the animal (710).

In some configurations, the asymmetrically signed updated record is added to a distributed ledger, the distributed ledger allowing only an owner of an NFT (Non-Fungible Token) associated with the animal to modify portions of the distributed ledger associated with the animal.

In some configurations, the tags are RFID (Radio Frequency Identification) tags, the livestock tag reader being configured to receive RFID tags. In some configurations, the tags are NFC (Near Field Communication) tags, the livestock tag reader being configured to receive NFC tags. In some configurations, the tags are Bluetooth tags, the livestock tag reader being configured to receive Bluetooth tags. In some configurations, the tags are QR (Quick Response) tags, the livestock tag reader being configured to receive QR tags. In yet other configurations, the tags can have more than one of RFID, NFC, Bluetooth, and QR capability.

In some configurations, the encryption is asymmetrical encryption, and wherein the encrypted signed updated record is signed using a private key.

In some configurations, the encryption is symmetrical encryption.

In some configurations, the illustrated method can further include: transmitting, via the network interface, the encrypted signed updated record and the cryptographic signature to decentralized database; obtaining consensus from a plurality of other computing devices regarding adding the encrypted signed updated record to a blockchain; and based on the consensus, adding the encrypted signed updated record to the blockchain.

Figure 8:
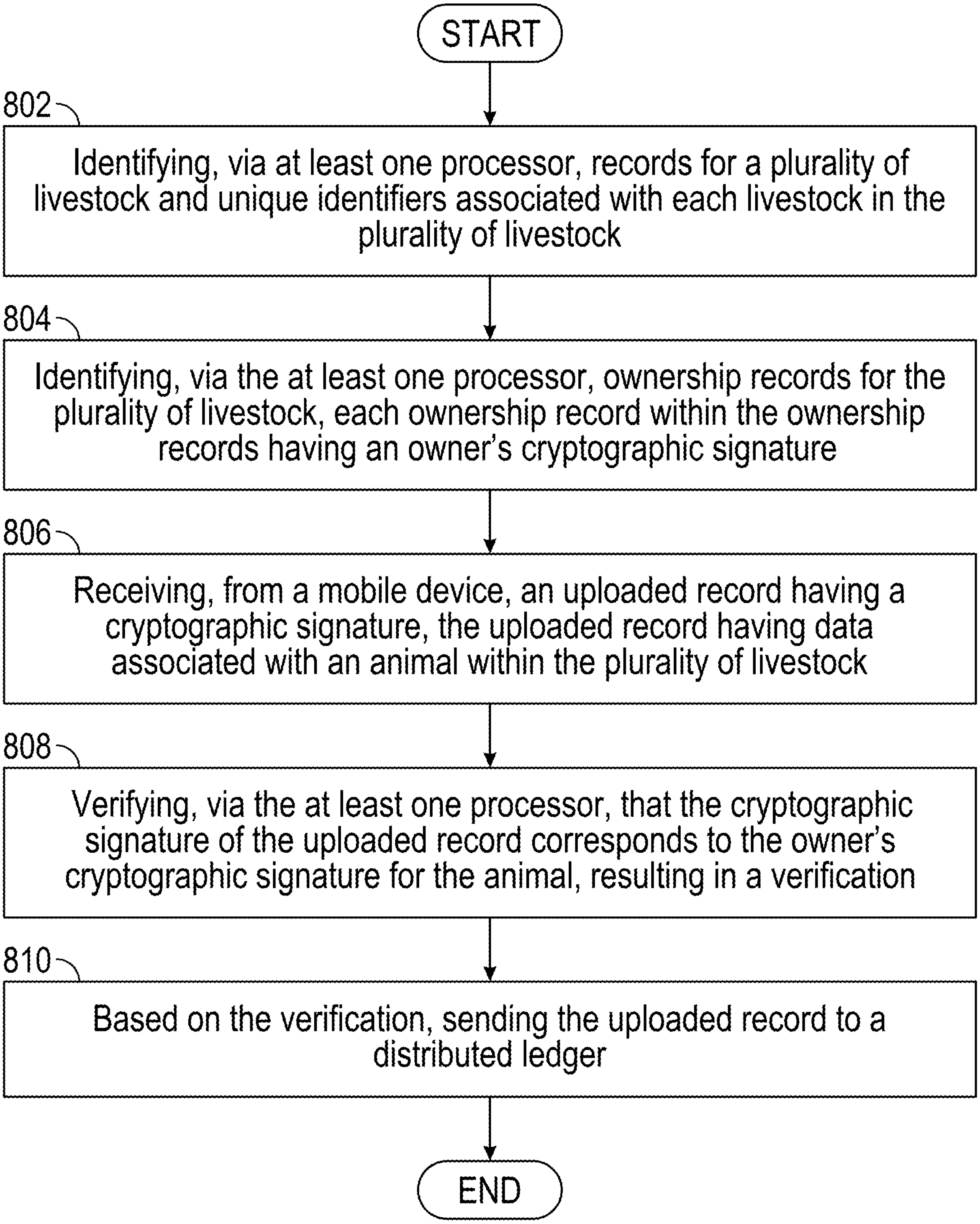
FIG. 8 illustrates a third example method embodiment.

FIG. 8 illustrates a third example method embodiment. The illustrated method can be performed by a system which includes at least one processor. In this example, the system identifies, via the at least one processor, records for a plurality of livestock and unique identifiers associated with each livestock in the plurality of livestock (802). The system can then identify, via the at least one processor, ownership records for the plurality of livestock, each ownership records within the ownership records having an owner's cryptographic signature (804). The system can then receive, from a mobile device, an updated record having a cryptographic signature, the uploaded record having data associated with an animal within the plurality of livestock (806), and verify, via the at least one processor, that the cryptographic signature of the uploaded record corresponds to the owner's cryptographic signature for the animal, resulting in a verification (808). The system can then, based on the verification, send the uploaded record to a distributed ledger (810).

In some configurations, the at least one processor are contained within a server.

In some configurations, the at least one processor are executing a smart contract using a blockchain. For example, the blockchain can be Ethereum.

In some configurations, the records for the plurality of livestock comprise health and location data for the animal over multiple periods of time.

In some configurations, the cryptographic signature and the owner's cryptographic signature are a cryptographic hash.

In some configurations, the owner's cryptographic signature is associated with more than one entity or individual.

In some configurations, the uploaded record is received via a Low Power Wide Area Network (LPWAN).

Figure 9:
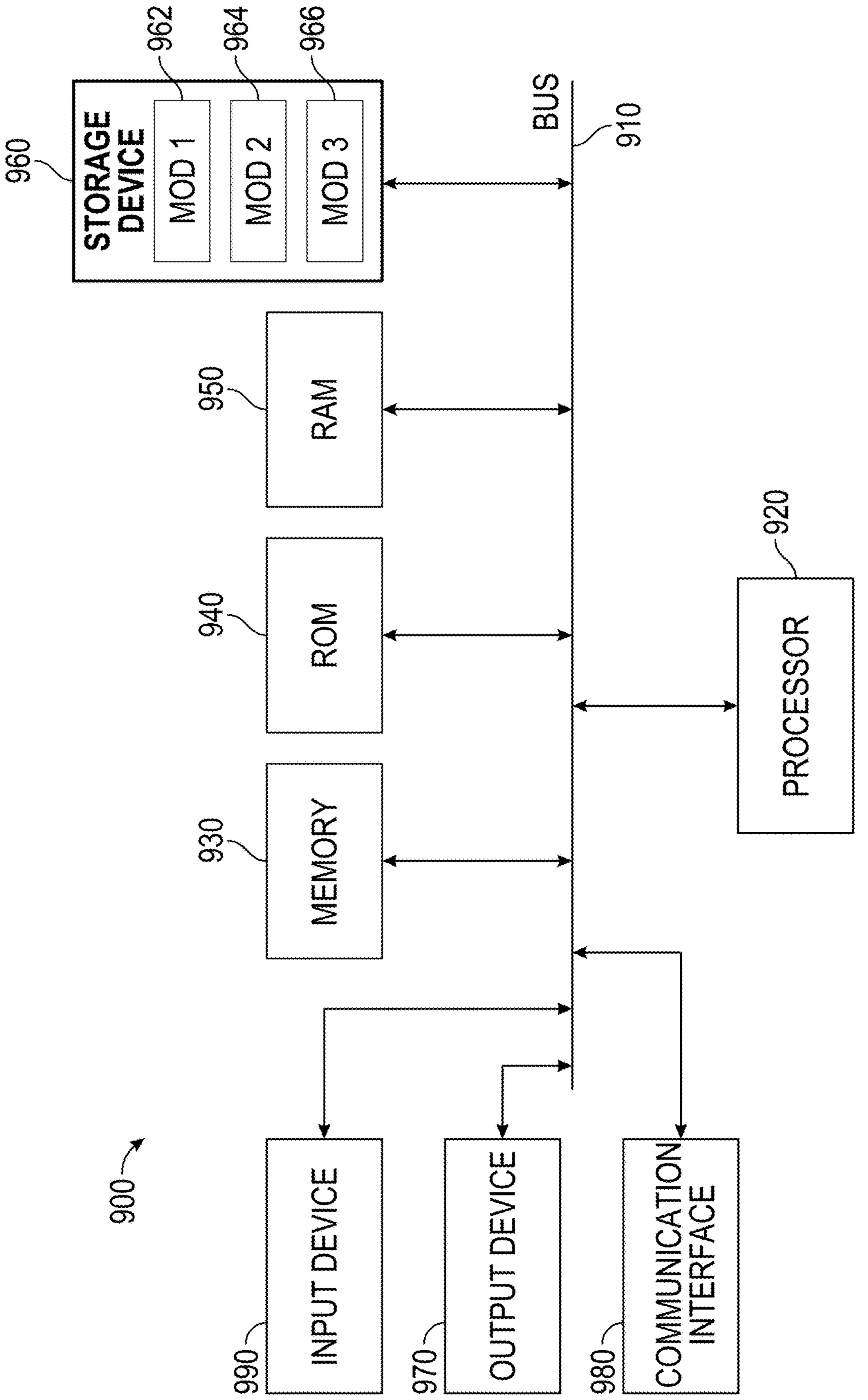
FIG. 9 illustrates an example computer system.

With reference to FIG. 9, an exemplary system includes a general-purpose computing device 900, including a processing unit (CPU or processor) 920 and a system bus 910 that couples various system components including the system memory 930 such as read-only memory (ROM) 940 and random access memory (RAM) 950 to the processor 920. The system 900 can include a cache of high-speed memory connected directly with, in close proximity to, or integrated as part of the processor 920. The system 900 copies data from the memory 930 and/or the storage device 960 to the cache for quick access by the processor 920. In this way, the cache provides a performance boost that avoids processor 920 delays while waiting for data. These and other modules can control or be configured to control the processor 920 to perform various actions. Other system memory 930 may be available for use as well. The memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general purpose processor and a hardware module or software module, such as module 1 962, module 2 964, and module 3 966 stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output (BIOS) stored in ROM 940 or the like, may provide the basic routine that helps to transfer information between elements within the computing device 900, such as during start-up. The computing device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer-readable storage media provide nonvolatile storage of computer-readable instructions, data structures, program modules and other data for the computing device 900. In one aspect, a hardware module that performs a particular function includes the software component stored in a tangible computer-readable storage medium in connection with the necessary hardware components, such as the processor 920, bus 910, display 970, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 900 is a small, handheld computing device, a desktop computer, or a computer server.

Although the exemplary embodiment described herein employs the hard disk 960, other types of computer-readable media which can store data that are accessible by a computer, such as magnetic cassettes, flash memory cards, digital versatile disks, cartridges, random access memories (RAMs) 950, and read-only memory (ROM) 940, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 900, an input device 990 represents any number of input mechanisms, such as a microphone for speech, a touch-sensitive screen for gesture or graphical input, keyboard, mouse, motion input, speech and so forth. An output device 970 can also be one or more of a number of output mechanisms known to those of skill in the art. In some instances, multimodal systems enable a user to provide multiple types of input to communicate with the computing device 900. The communications interface 980 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Further aspects of the present disclosure are provided by the subject matter of the following clauses.

A system comprising: at least one processor; a network interface; a livestock tag reader; a database storing uniquely identified tags for a plurality of livestock, and storing records associated with the plurality of livestock; a non-transitory computer-readable storage medium having instructions stored which, when executed by the at least one processor, cause the at least one processor to perform operations comprising: receiving, via the livestock tag reader, a tag for an animal in the plurality of livestock; identifying, by comparison of the tag to the uniquely identified tags, a record of the animal within the database; adding, to the record of the animal in the database, at least one of additional health or location data of the animal, resulting in an updated record of the animal; cryptographically signing the updated record of the animal using encryption, resulting in an encrypted signed updated record; and transmitting, via the network interface, the encrypted signed updated record to a network server which verifies that a cryptographic signature of the encrypted signed uploaded record corresponds to an owner's cryptographic signature for the animal.

The system of any preceding clause, wherein the asymmetrically signed updated record is added to a distributed ledger, the distributed ledger allowing only an owner of an NFT (Non-Fungible Token) associated with the animal to modify portions of the distributed ledger associated with the animal.

The system of any preceding clause, wherein the tag is a RFID (Radio Frequency Identification) tag, the livestock tag reader being configured to receive RFID tags.

The system of any preceding clause, wherein the tag is a NFC (Near Field Communication) tag, the livestock tag reader being configured to receive NFC tags.

The system of any preceding clause, wherein the tag is a Bluetooth tag, the livestock tag reader being configured to receive Bluetooth tags.

The system of any preceding clause, wherein the tags is a QR (Quick Response) tag, the livestock tag reader being configured to receive QR tags.

The system of any preceding clause, wherein the encryption is asymmetrical encryption, and wherein the encrypted signed updated record is signed using a private key.

The system of any preceding clause, wherein the encryption is symmetrical encryption.

The system of any preceding clause, the non-transitory computer-readable storage medium having additional instructions stored which, when executed by the processor, cause the processor to perform operations comprising: transmitting, via the network interface, the encrypted signed updated record and the cryptographic signature to decentralized database; obtaining consensus from a plurality of other computing devices regarding adding the encrypted signed updated record to a blockchain; and based on the consensus, adding the encrypted signed updated record to the blockchain.

A method for notarizing livestock records, comprising: identifying, via at least one processor, records for a plurality of livestock and unique identifiers associated with each livestock in the plurality of livestock; identifying, via the at least one processor, ownership records for the plurality of livestock, each ownership record within the ownership records having an owner's cryptographic signature; receiving, from a mobile device, an uploaded record having a cryptographic signature, the uploaded record having data associated with an animal within the plurality of livestock; verifying, via the at least one processor, that the cryptographic signature of the uploaded record corresponds to the owner's cryptographic signature for the animal, resulting in a verification; based on the verification, sending the uploaded record to a distributed ledger.

The method of any preceding clause, wherein the at least one processor are contained within a server.

The method of any preceding clause, wherein the at least one processor are executing a smart contract using a blockchain.

The method of any preceding clause, wherein the blockchain is Ethereum.

The method of any preceding clause, wherein the records for the plurality of livestock comprise health and location data for the animal over multiple periods of time.

The method of any preceding clause, wherein the cryptographic signature and the owner's cryptographic signature are a cryptographic hash.

The method of any preceding clause, wherein the owner's cryptographic signature is associated with more than one entity or individual.

The method of any preceding clause, wherein the uploaded record is received via a Low Power Wide Area Network (LPWAN).

A non-transitory computer-readable storage medium having instructions stored which, when executed by at least one processor, causes the at least one processor to perform operations comprising: identifying records for a plurality of livestock and unique identifiers associated with each livestock in the plurality of livestock; identifying ownership records for the plurality of livestock, each ownership record within the ownership records having an owner's cryptographic signature; receiving, from a mobile device, an uploaded record having a cryptographic signature, the uploaded record having data associated with an animal within the plurality of livestock; verifying that the cryptographic signature of the uploaded record corresponds to the owner's cryptographic signature for the animal, resulting in a verification; based on the verification, sending the uploaded record to a distributed ledger.

The non-transitory computer-readable storage medium of any preceding clause, wherein the at least one processor are contained within a server.

The non-transitory computer-readable storage medium of any preceding clause, wherein the at least one processor are executing a smart contract using a blockchain.

I claim:

1. A system comprising:
- at least one processor;
- a network interface;
- a livestock tag reader;
- a database storing uniquely identified ear tags for a plurality of livestock, and storing records associated with the plurality of livestock;
- a non-transitory computer-readable storage medium having instructions stored which, when executed by the at least one processor, cause the at least one processor to perform operations comprising:
  - scanning, via the livestock tag reader, an ear tag for an animal in the plurality of livestock, the ear tag hanging from an ear of the animal, the ear tag comprising a QR (Quick Response) tag on a portion of the ear tag hanging below the ear of the animal;
  - identifying, by comparison of the ear tag to the uniquely identified ear tags, a record of the animal within the database;
  - adding, to the record of the animal in the database, wherein the database is an InterPlanetary File System (IPFS) database:
    - (1) at least one of additional health data about the animal or location data about the animal; and
    - (2) further proof of life data of the animal generated by an implanted device on the animal and wirelessly transmitted to a mobile device, the proof of life data comprising a heart rate and a temperature of the animal, resulting in an updated record of the animal;
  - cryptographically signing the updated record of the animal using encryption, resulting in an encrypted signed updated record;
  - transmitting, via the network interface, the encrypted signed updated record to a network server which verifies that a cryptographic signature of the encrypted signed updated record corresponds to a cryptographic signature for the animal belonging to a first owner, wherein the encrypted signed updated record is added to a distributed ledger, the distributed ledger allowing only an owner of an NFT (Non-Fungible Token) associated with the animal to modify portions of the distributed ledger associated with the animal;

generating unique digital identity data for the animal, the unique digital identity data comprising a combination of:
images of the animal;
a unique Bluetooth identification associated with the implanted device; and
owner input,
the unique digital identity data being sent to a distributed ledger as part of a smart contract resulting in a non-fungible token (NFT) for the animal;
receiving, from the first owner, instructions to transfer ownership of the animal to a second owner;
transferring rights to update the record of the animal in the database from the first owner to the second owner;
transmitting, via the network interface, the encrypted signed updated record and the cryptographic signature to a decentralized database;
obtaining consensus from a plurality of other computing devices regarding adding the encrypted signed updated record to a blockchain; and
based on the consensus, adding the encrypted signed updated record to the NFT, wherein the adding of the encrypted signed updated record to the NFT comprises:
retrieving an existing reference of existing files attached to the NFT from the blockchain using a SHA-256 hash of the existing files as attached to ERC-721 metadata of the NFT;
inspecting new files to ensure that reference is made to the existing reference of existing files by inspecting a designated location in a JSON payload;
rejecting an update upon determining the new files do not include a reference to the existing files by reverting a blockchain transaction;
setting the new files as a NFT reference by setting the ERC-721 metadata to a SHA-256 hash of the new files; and
persisting the new files to the IPFS database.

2. The system of claim 1, wherein the ear tag further comprises a RFID (Radio Frequency Identification) tag, the livestock tag reader being configured to receive RFID tag.

3. The system of claim 2, the non-transitory computer-readable storage medium having additional instructions stored which, when executed by the processor, cause the processor to perform operations comprising:
receiving biometric data associated with the animal, the biometric data comprising identification generated from a recorded video;
receiving owner input from the first owner; and
generating digital identity data for the animal, the digital identity data comprising a combination of the biometric data, a unique Bluetooth identification associated with an implanted device on the animal, and the owner input,
wherein the identifying of the record is further performed by comparing the digital identity data to previously recorded digital identity data for the animal.

4. The system of claim 1, wherein the ear tag further comprises a NFC (Near Field Communication) tag, the livestock tag reader being configured to receive NFC tags.

5. The system of claim 1, wherein the ear tag further comprises a Bluetooth tag, the livestock tag reader being configured to receive Bluetooth tags.

6. The system of claim 1, wherein the encryption is asymmetrical encryption, and wherein the encrypted signed updated record is signed using a private key.

7. The system of claim 1, wherein the encryption is symmetrical encryption.

8. The system of claim 1, the non-transitory computer-readable storage medium having additional instructions stored which, when executed by the processor, cause the processor to perform operations comprising:
transmitting, via the network interface, the encrypted signed updated record and the cryptographic signature to decentralized database;
obtaining consensus from a plurality of other computing devices regarding adding the encrypted signed updated record to a blockchain; and
based on the consensus, adding the encrypted signed updated record to the blockchain.

9. The system of claim 1, wherein the database is an InterPlanetary File System (IPFS) database.

10. A method for notarizing livestock records, comprising:
identifying, via at least one processor, records for a plurality of livestock and unique identifiers associated with each livestock in the plurality of livestock;
identifying, via the at least one processor, ownership records for the plurality of livestock, each ownership record within the ownership records having a cryptographic signature belonging to a first owner;
receiving, from a mobile device, an encrypted signed updated record having a cryptographic signature, the encrypted signed updated record having proof of life data associated with an animal within the plurality of livestock, wherein:
the proof of life data is generated by an implanted device on the animal, the implanted device wirelessly transmitting the proof of life data to a mobile device;
the proof of life data comprises a heart rate of the animal, a temperature of the animal, movement of the animal, and location of the animal; and
the implanted device hangs from an ear of the animal, the implanted device comprising a QR (Quick Response) tag on a portion of the implanted device hanging below the ear of the animal;
adding, to a record of the animal in a database, wherein the database is an InterPlanetary File System (IPFS) database, the proof of life data;
verifying, via the at least one processor, that the cryptographic signature of the encrypted signed updated record corresponds to the cryptographic signature of the first owner for the animal, resulting in a verification;
based on the verification, sending the encrypted signed updated record to a distributed ledger;
generating unique digital identity data for the animal, the unique digital identity data comprising a combination of:
images of the animal;
a unique Bluetooth identification associated with the implanted device; and
owner input,
the unique digital identity data being sent to the distributed ledger as part of a smart contract resulting in an ERC-721 non-fungible token (NFT) for the animal;
receiving, from the first owner, instructions to transfer ownership of the animal to a second owner;

transferring rights to update an animal-specific ownership record associated with the animal from the first owner to the second owner;

transmitting, via a network interface, the encrypted signed updated record and the cryptographic signature to a decentralized database;

obtaining consensus from a plurality of other computing devices regarding adding the encrypted signed updated record to a blockchain; and based on the consensus, adding the encrypted signed updated record to the NFT, wherein the adding of the encrypted signed updated record to the NFT comprises:

retrieving an existing reference of existing files attached to the NFT from the blockchain using a SHA-256 hash of the existing files as attached to ERC-721 metadata of the NFT;

inspecting new files to ensure that reference is made to the existing reference of existing files by inspecting a designated location in a JSON payload;

rejecting an update upon determining the new files do not include a reference to the existing files by reverting a blockchain transaction;

setting the new files as a NFT reference by setting the ERC-721 metadata to a SHA-256 hash of the new files; and persisting the new files to the IPFS database.

11. The method of claim 10, wherein the at least one processor are contained within a server.

12. The method of claim 10, wherein the at least one processor are executing a contract using a blockchain.

13. The method of claim 12, wherein the blockchain is Ethereum.

14. The method of claim 10, wherein the records for the plurality of livestock comprise health and location data for the animal over multiple periods of time.

15. The method of claim 10, wherein the cryptographic signature and an owner's cryptographic signature of the owner are a cryptographic hash.

16. The method of claim 10, wherein an owner's cryptographic signature of the owner is associated with more than one entity or individual.

17. The method of claim 10, wherein the encrypted signed updated record is received via a Low Power Wide Area Network (LPWAN).

18. A non-transitory computer-readable storage medium having instructions stored which, when executed by at least one processor, causes the at least one processor to perform operations comprising:

identifying records for a plurality of livestock and unique identifiers associated with each livestock in the plurality of livestock;

identifying ownership records for the plurality of livestock, each ownership record within the ownership records having a cryptographic signature of a first owner;

receiving, from a mobile device, identification of an animal within the plurality of livestock, the identification determined by scanning an ear tag of the animal, the ear tag comprising a QR (Quick Response) tag on a first portion of the ear tag hanging below the ear of the animal;

receiving, from the mobile device, an encrypted signed updated record having a cryptographic signature, the encrypted signed updated record having proof of life data associated with the animal within the plurality of livestock, the proof of data comprising:

a heart rate of the animal;

a location of the animal;

movement of the animal; and a temperature of the animal, the proof of life data generated by a second portion of the ear tag extending through the ear of the animal;

adding, to a record of the animal in a database, wherein the database is an InterPlanetary File System (IPFS) database, the proof of life data;

verifying that the cryptographic signature of the encrypted signed updated record corresponds to the cryptographic signature of the first owner for the animal, resulting in a verification;

based on the verification, sending the encrypted signed updated record to a distributed ledger;

generating unique digital identity data for the animal, the unique digital identity data comprising a combination of:

images of the animal;

a unique Bluetooth identification associated with the ear tag; and owner input, the unique digital identity data being sent to the distributed ledger as part of a smart contract resulting in a non-fungible token (NFT) for the animal;

receiving, from the first owner, instructions to transfer ownership of the animal to a second owner;

transferring rights to update an animal-specific ownership record associated with the animal from the first owner to the second owner;

transmitting, via a network interface, the encrypted signed updated record and the cryptographic signature to a decentralized database;

obtaining consensus from a plurality of other computing devices regarding adding the encrypted signed updated record to a blockchain; and based on the consensus, adding the encrypted signed updated record to the NFT, wherein the adding of the encrypted signed updated record to the NFT comprises:

retrieving an existing reference of existing files attached to the NFT from the blockchain using a SHA-256 hash of the existing files as attached to ERC-721 metadata of the NFT;

inspecting new files to ensure that reference is made to the existing reference of existing files by inspecting a designated location in a JSON payload;

rejecting an update upon determining the new files do not include a reference to the existing files by reverting a blockchain transaction;

setting the new files as a NFT reference by setting the ERC-721 metadata to a SHA-256 hash of the new files; and persisting the new files to the IPFS database.

19. The non-transitory computer-readable storage medium of claim 18, wherein the at least one processor are contained within a server.

20. The non-transitory computer-readable storage medium of claim 18, wherein the at least one processor are executing a contract using a blockchain.

* * * * *